Apr. 3, 1923.
M. A. ROSS
BEARING
Filed Nov. 16, 1921
1,450,308
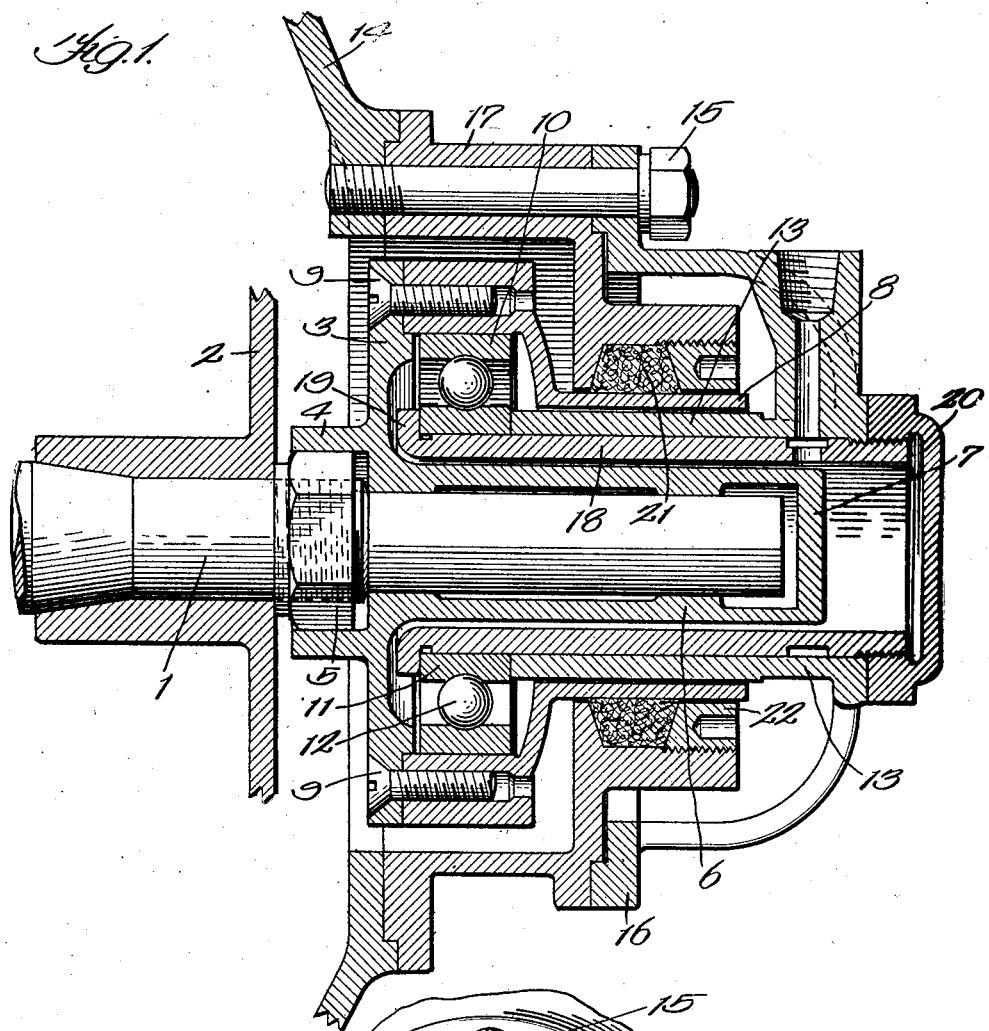
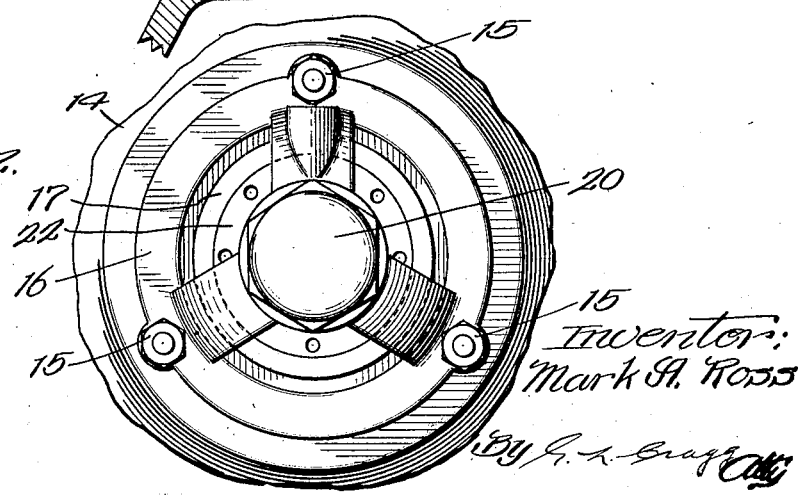

Patented Apr. 3, 1923.

1,450,308

UNITED STATES PATENT OFFICE.

MARK A. ROSS, OF FLOSSMOOR, ILLINOIS, ASSIGNOR OF ONE-HALF TO HARRY P. BAYLEY, OF CHICAGO, ILLINOIS.

BEARING.

Application filed November 16, 1921. Serial No. 515,552.

*To all whom it may concern:*

Be it known that I, MARK A. Ross, citizen of the United States, residing at Flossmoor, in the county of Cook and State of Illinois, have invented a certain new and useful Improvement in Bearings, of which the following is a full, clear, concise, and exact description.

My invention relates to turbines and also to bearings entering into the construction thereof and has a number of objects and advantages in view.

The invention has for one of its objects the provision of improved means for assembling the shaft with a bearing or other member that is to be assembled with the shaft. In carrying out this object of the invention a nut is threaded upon the shaft and the member has a socket receiving the nut or is provided with some other suitable portion serving to engage the sides of the nut whereby the nut serves to hold the member and shaft in assembly. The member thus assembled with the shaft is preferably a portion of a bearing structure that carries an outer raceway that turns with the shaft, there being an inner raceway that is preferably stationary. Balls or other suitable rollers are interposed between the raceways. When the structure is embodied in a turbine, packing is employed in a suitable wall, the roller bearing being between the packing and the impact wheel of the turbine, whereby passage of the steam to the roller bearing is obstructed. Passage of moisture to the roller bearing is further guarded against by forming the bearing member that is assembled with the shaft with a hollow extension into which the shaft extends and which hollow extension has an end wall opposite the end of the shaft that is in this extension so that any moisture creeping along the shaft is trapped within the confined space of this hollow extension.

The invention has other characteristics and will be fully explained by reference to the accompanying drawing showing the preferred embodiment thereof as applied to a turbine, Fig. 1 being a longitudinal sectional view; and Fig. 2 an end view on a smaller scale.

Like parts are indicated by similar characters of reference in both figures.

The turbine illustrated includes any suitable form of rotating shaft 1 that carries an impact wheel 2 of any desired and suitable construction. A bearing member 3 surrounds the shaft and is formed with a socket 4 that opens toward the impact wheel and which is shaped snugly to engage the nut 5 which is screwed upon the shaft whereby the bearing member and shaft are caused to turn together. The bearing member 3 carries or is otherwise provided with a hollow extension 6 into which said shaft projects and in which the shaft terminates, this hollow extension projecting away from the impact wheel. It has an end wall 7 opposite the end of the shaft that is in this hollow extension, whereby passage of exhaust steam along the shaft into the space surrounding the end of the shaft is prevented. The bearing member 3 desirably also has a second hollow extension 8 that surrounds and is spaced apart from the first hollow extension 6, the extension 8 being preferably separately formed and afterwards assembled with the body of the bearing member 3 by means of the screws 9. An outer roller bearing raceway 10 is provided upon and within the second hollow extension 8 and is preferably separately formed and thereafter assembled with said extension, whereby said raceway is caused to turn as the shaft rotates. An inner raceway 11 is surrounded by the outer raceway 10 and balls or other rollers 12 are interposed between the raceways. A stationary sleeve 13 is provided in the space between the hollow extensions and is preferably assembled with the casing 14 of the turbine by means of the bolts 15 that pass through the ring 16 with which the sleeve 13 is cast, the bolts 15 also serving to clamp the wall portion 17 between the casing 14 and the ring 16. One end of the sleeve 13 engages one side of the inner raceway 11. A second sleeve 18 is surrounded by and is movable longitudinally of the first and is formed with a flange 19 that engages the other side of the inner raceway, the inner raceway surrounding the sleeve 18. A cap nut 20 is threaded upon the outer end of the sleeve 18 and engages the other end of the sleeve 13 whereby the inner raceway 19 is clamped or held between the sleeves. A fluid tight packing 21 is carried by the wall 17 and is interposed between the same and the outer hollow extension 8 whereby passage of moisture to the roller bearing is prevented, this roller bearing being between the packing and the impact wheel. The packing is held in place by means of a ring 22 that is in threaded engagement with the wall 17 and in abutting engagement with the packing.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a turbine, the combination with the rotating shaft thereof; of an impact wheel upon the shaft; a bearing member turning with the shaft and formed with a hollow extension into which said shaft projects and in which the shaft terminates, said hollow extension projecting away from the impact wheel and having an end wall opposite the end of the shaft that is in this hollow extension, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; a nut in threaded engagement with the second sleeve and abutting against the other end of the first sleeve to hold the inner raceway between said sleeves; a wall surrounding said extensions and sleeves; and a fluid tight packing between said wall and the aforesaid second hollow extension, said raceways and rollers being between the impact wall and the packing.

2. In a turbine, the combination with the rotating shaft thereof; of an impact wheel upon the shaft; a bearing member turning with the shaft and formed with a hollow extension into which said shaft projects and in which the shaft terminates, said hollow extension projecting away from the impact wheel and having an end wall opposite the end of the shaft that is in this hollow extension, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; and a nut in threaded engagement with the second sleeve and abutting against the other end of the first sleeve to hold the inner raceway between said sleeves.

3. The combination with a rotating shaft; of a bearing member turning with the shaft and formed with a hollow extension into which said shaft projects and in which the shaft terminates, said hollow extension having an end wall opposite the end of the shaft that is in this hollow extension, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; a nut in threaded engagement with the second sleeve and abutting against the other end of the first sleeve to hold the inner raceway between said sleeves; a wall surrounding said extensions and sleeves; and a fluid tight packing between said wall and the aforesaid second hollow extension.

4. The combination with a rotating shaft; of a bearing member turning with the shaft and formed with a hollow extension into which said shaft projects and in which the shaft terminates, said hollow extension having an end wall opposite the end of the shaft that is in this hollow extension, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; and a nut in threaded engagement with the second sleeve and abutting against the other end of the first sleeve to hold the inner raceway between said sleeves.

5. In a turbine, the combination with the rotating shaft thereof; of an impact wheel upon the shaft; and a bearing member turning with the shaft and formed with a hollow extension into which said shaft projects and in which the shaft terminates, said hollow extension projecting away from the impact wheel and having an end wall opposite the end of the shaft that is in this hollow extension.

6. In a turbine, the combination with the rotating shaft thereof; of an impact wheel upon the shaft; a bearing member turning with the shaft and formed with a hollow extension into which said shaft projects and in which the shaft terminates, said hollow extension projecting away from the impact wheel and having an end wall opposite the end of the shaft that is in this hollow extension, said bearing member also having a second hollow extension surrounding and spaced apart from the first hollow extension; an outer roller bearing raceway upon and within the second hollow extension; an inner raceway; and rollers between said raceways.

7. In a turbine, the combination with a rotating shaft thereof; of an impact wheel upon the shaft; a bearing member turning with the shaft and formed with a hollow extension into which said shaft projects and in which the shaft terminates, said hollow extension projecting away from the impact wheel and having an end wall opposite the end of the shaft that is in this hollow extension; a wall; and a fluid tight packing between said wall and bearing member, said raceways and rollers being between the impact wheel and the packing.

8. In a turbine, the combination with the rotating shaft thereof; of an impact wheel upon the shaft; a bearing member turning with the shaft and formed with a hollow extension into which said shaft projects and in which the shaft terminates, said hollow extension projecting away from the impact wheel and having an end wall opposite the end of the shaft that is in this hollow extension, said bearing member also having a second hollow extension surrounding and spaced apart from the first hollow extension; an outer roller bearing raceway upon and within the second hollow extension; an inner raceway; rollers between said raceways; a wall; and a fluid tight packing between said wall and bearing member, said raceways and rollers being between the impact wheel and the packing.

In witness whereof, I hereunto subscribe my name this 9th day of November A. D., 1921.

MARK A. ROSS.